United States Patent
Abuelsaad et al.

(10) Patent No.: US 9,680,715 B2
(45) Date of Patent: Jun. 13, 2017

(54) ASSESSING A SERVICE OFFERING IN A NETWORKED COMPUTING ENVIRONMENT

(71) Applicant: International Business Machines Corporation, Armonk, NY (US)

(72) Inventors: Kelly Abuelsaad, Somers, NY (US); Lisa Seacat DeLuca, San Francisco, CA (US); Soobaek Jang, Hamden, CT (US); Daniel C. Krook, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 736 days.

(21) Appl. No.: 14/149,068

(22) Filed: Jan. 7, 2014

(65) Prior Publication Data

US 2015/0195172 A1    Jul. 9, 2015

(51) Int. Cl.
*H04L 12/26* (2006.01)
*H04L 12/24* (2006.01)

(52) U.S. Cl.
CPC ...... *H04L 41/5061* (2013.01); *H04L 41/0883* (2013.01)

(58) Field of Classification Search
CPC .................... H04L 41/0883; H04L 41/5061
See application file for complete search history.

(56) References Cited

U.S. PATENT DOCUMENTS

| 8,244,559 B2 | 8/2012 | Horvitz et al. |
| 8,271,655 B2 | 9/2012 | Dawson et al. |
| 2006/0021014 A1* | 1/2006 | Hartman ............... G06F 8/61 726/6 |
| 2008/0221987 A1 | 9/2008 | Sundaresan et al. |
| 2010/0223378 A1* | 9/2010 | Wei ............ H04L 41/0896 709/224 |
| 2011/0138050 A1 | 6/2011 | Dawson et al. |
| 2011/0231899 A1* | 9/2011 | Pulier ............ G06F 9/45558 726/1 |
| 2012/0016778 A1 | 1/2012 | Salle et al. |

(Continued)

OTHER PUBLICATIONS

Maitland, J., "Keeping Control Isn't Easy", Chapter 4: Cloud-Based Infrastructure, SearchCloudComputing.com, Publication Date: Oct. 2009, 17 pages.

(Continued)

*Primary Examiner* — Nicholas Taylor
*Assistant Examiner* — Afroza Sultana
(74) *Attorney, Agent, or Firm* — William H. Hartwell; Hunter E. Webb; Keohane & D'Alessandro PLLC (57) ABSTRACT

An approach for assessing a service offering selected by a user in a networked computing environment (e.g., a cloud computing environment) is provided. In one aspect, a network environment containing the service offering is monitored for a software configuration activity performed by the user. This software configuration activity is analyzed to identify the software application that is being configured. A set of provider-managed service offerings can be searched for any provider-managed service offering that contains an offered application corresponding to that of the software application. This managed service offering can be included in an alternative suggestion for the service offering.

17 Claims, 6 Drawing Sheets

(56) References Cited

U.S. PATENT DOCUMENTS

2012/0158821 A1* 6/2012 Barros .............. G06F 17/30563
709/203
2013/0060933 A1 3/2013 Tung et al.
2015/0095322 A1* 4/2015 Procopio ............. G06F 17/3053
707/723

OTHER PUBLICATIONS

Spence et al., Intel Information Technology, "Architecting Software as a Service for the Enterprise", Cloud Computing, Oct. 2009, 10 pages.
Maitland, J., "Keeping Control Isn't Easy", Chapter 4: Cloud-Based Infrastructure, SearchCloudComputing.com, 13 pages.
Mell et al., "The NIST Definition of Cloud Computing", National Institute of Standards and Technology, Information Technology Laboratory, Version 15, Oct. 7, 2009, 2 pages.

* cited by examiner

ASSESSING A SERVICE OFFERING IN A NETWORKED COMPUTING ENVIRONMENT

TECHNICAL FIELD

In general, embodiments of the present invention relate to offering of network services. Specifically, embodiments of the present invention relate to an approach for assessing a service offering selected by a user in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

On one level, cloud computing can be thought of as a paradigm which, among other goals, seeks to simplify the delivery and consumption of IT and software resources. For instance, to set up a database server, a traditional IT user previously would have purchased a physical piece of computer equipment and performed manual installation of the operating system and database software, requiring special skills as well as a considerable amount of time and effort on the part of the user. Cloud computing can streamline and/or simplify this process, and depending on the level of service purchased by the user, can require minimal skill in the specialized software or middleware that is being used, resulting in setup time that is typically faster than a traditional approach.

SUMMARY

In general, an approach for assessing a service offering selected by a user in a networked computing environment (e.g., a cloud computing environment) is provided. In an embodiment, a network environment containing the service offering is monitored for a software configuration activity performed by the user. This software configuration activity is analyzed to identify the software application that is being configured. A set of provider-managed service offerings can be searched for any provider-managed service offering that contains an offered application corresponding to that of the software application. This managed service offering can be included in an alternative suggestion for the service offering.

A first aspect of the present invention provides a method for assessing a service offering selected by a user in a networked computing environment, the method comprising the computer-implemented processes of: monitoring a network environment containing the service offering for a software configuration activity performed by the user; analyzing the software configuration activity to identify a software application that is being configured; searching a set of provider-managed service offerings for a provider-managed service offering that has an offered application corresponding to that of the software application; and assembling a alternative suggestion for the service offering that includes the provider-managed service offering.

A second aspect of the present invention provides a system for assessing a service offering selected by a user in a networked computing environment, comprising: a memory medium comprising instructions; a bus coupled to the memory medium; and a processor coupled to the bus that when executing the instructions causes the system to: monitor a network environment containing the service offering for a software configuration activity performed by the user; analyze the software configuration activity to identify a software application that is being configured; search a set of provider-managed service offerings for a provider-managed service offering that has an offered application corresponding to that of the software application; and assemble an alternative suggestion for the service offering that includes the provider-managed service offering.

A third aspect of the present invention provides a computer program product for assessing a service offering selected by a user in a cloud computing environment, the computer program product comprising a computer readable storage media, and program instructions stored on the computer readable storage media, that cause at least one computer device to: monitor a network environment containing the service offering for a software configuration activity performed by the user; analyze the software configuration activity to identify a software application that is being configured; search a set of provider-managed service offerings for a provider-managed service offering that has an offered application corresponding to that of the software application; and assemble an alternative suggestion for the service offering that includes the provider-managed service offering.

A fourth aspect of the present invention provides a method for deploying a system for assessing a service offering selected by a user in a networked computing environment, comprising: providing a computer infrastructure having at least one computer device that operates to: monitor a network environment containing the service offering for a software configuration activity performed by the user; analyze the software configuration activity to identify a software application that is being configured; search a set of provider-managed service offerings for a provider-managed service offering that has an offered application corresponding to that of the software application; and assemble an alternative suggestion for the service offering that includes the provider-managed service offering.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for assessing a service offering selected by a user in a networked computing environment (e.g., a cloud computing environment). In an embodiment, a network environment containing the service offering is monitored for a software configuration activity performed by the user. This software configuration activity is analyzed to identify the software application that is being configured. A set of provider-managed service offerings can be searched for any provider-managed service offering that contains an offered application corresponding to that of the software application. This managed service offering can be included in an alternative suggestion for the service offering.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows. On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
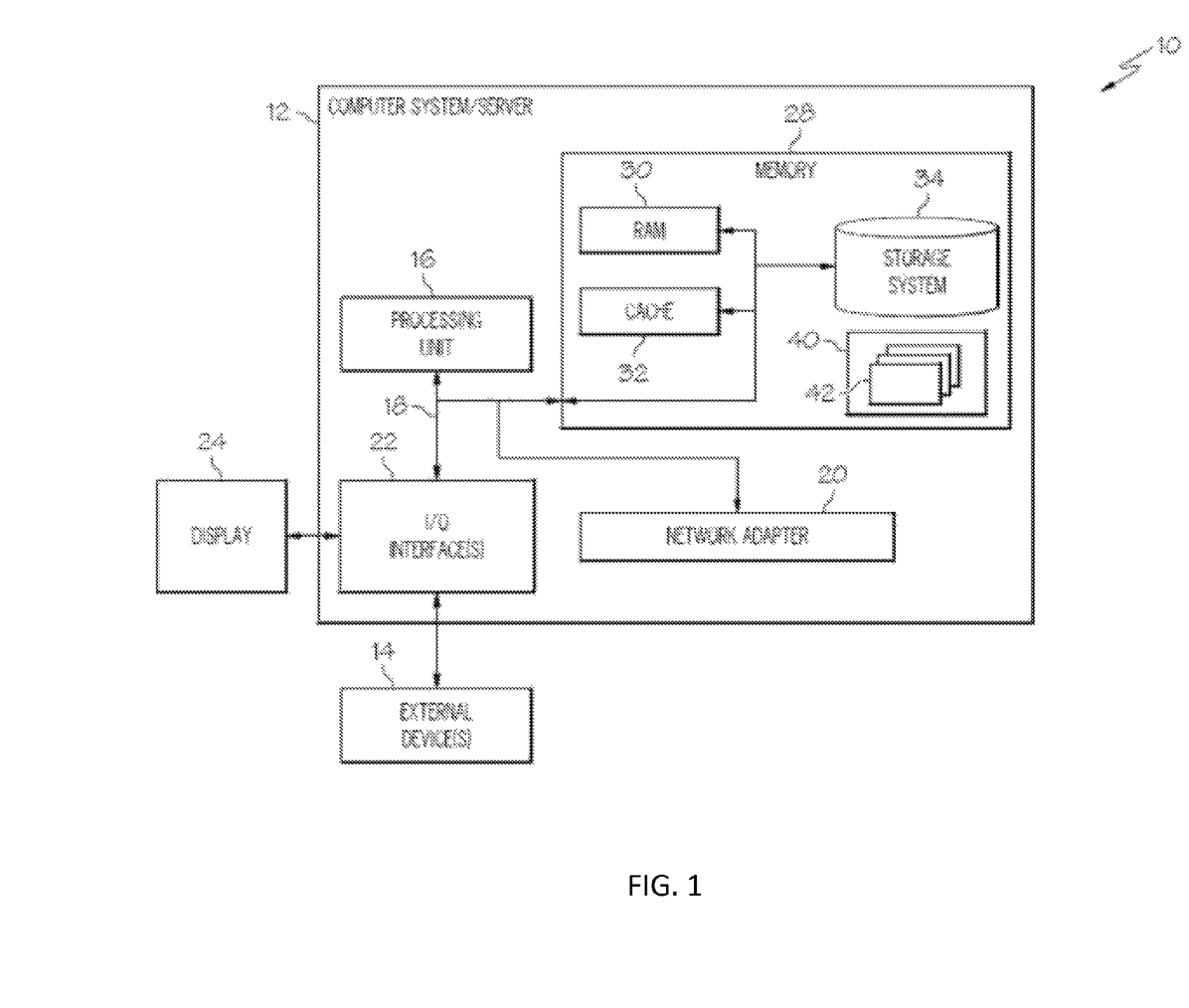
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
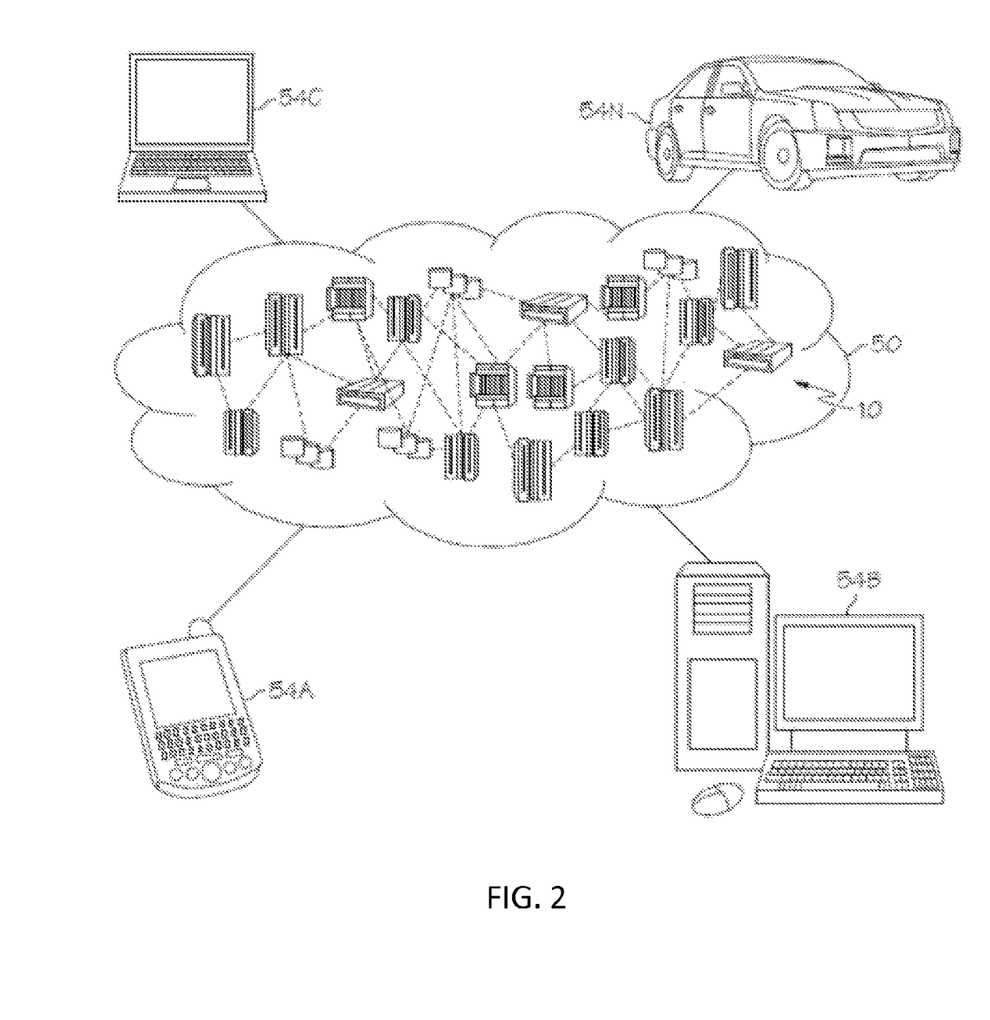
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
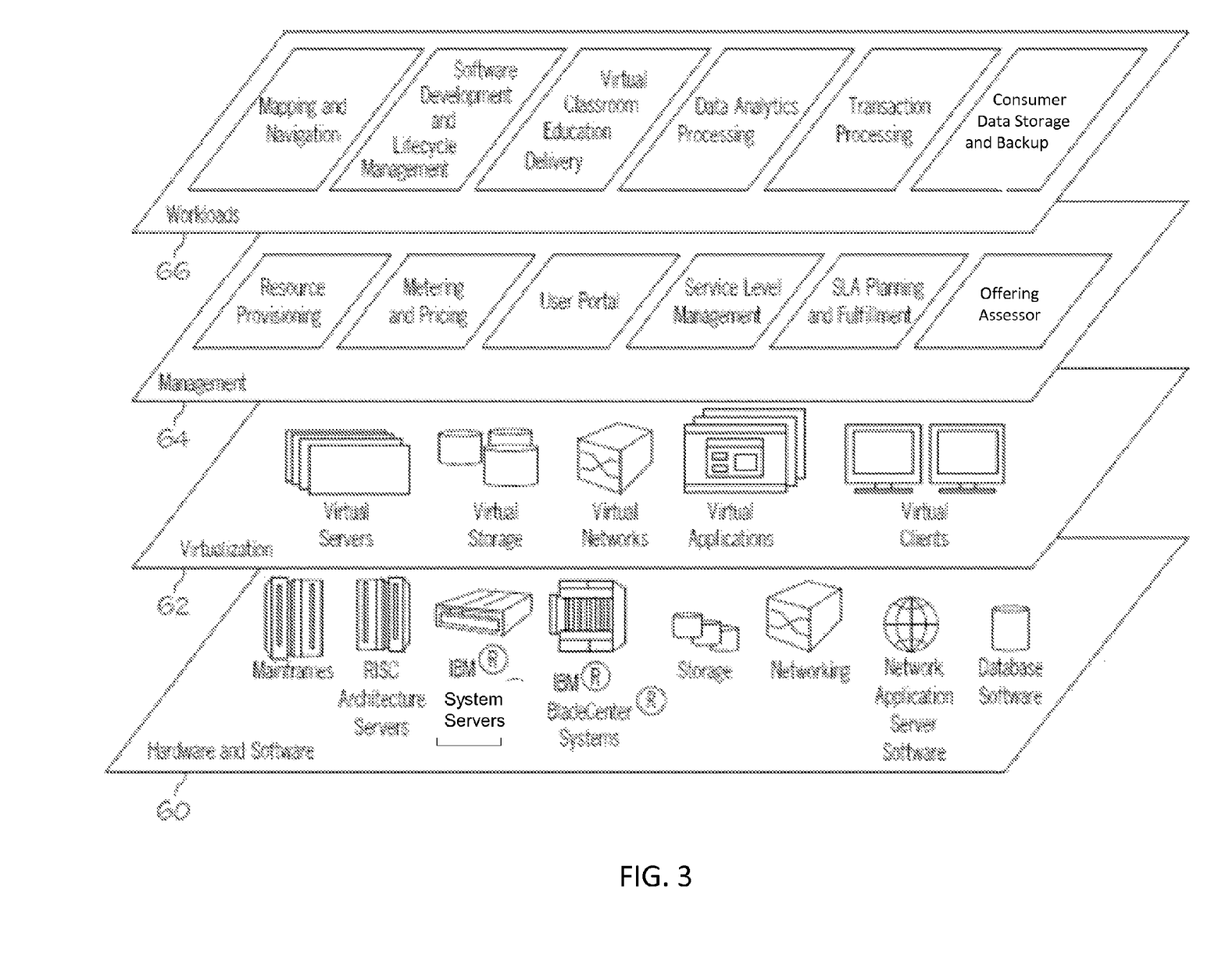
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is offering assessor, which represents the functionality that is provided under the embodiments of the present invention, e.g., by evaluating the merits of the offering to the user.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the command identification functionality of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
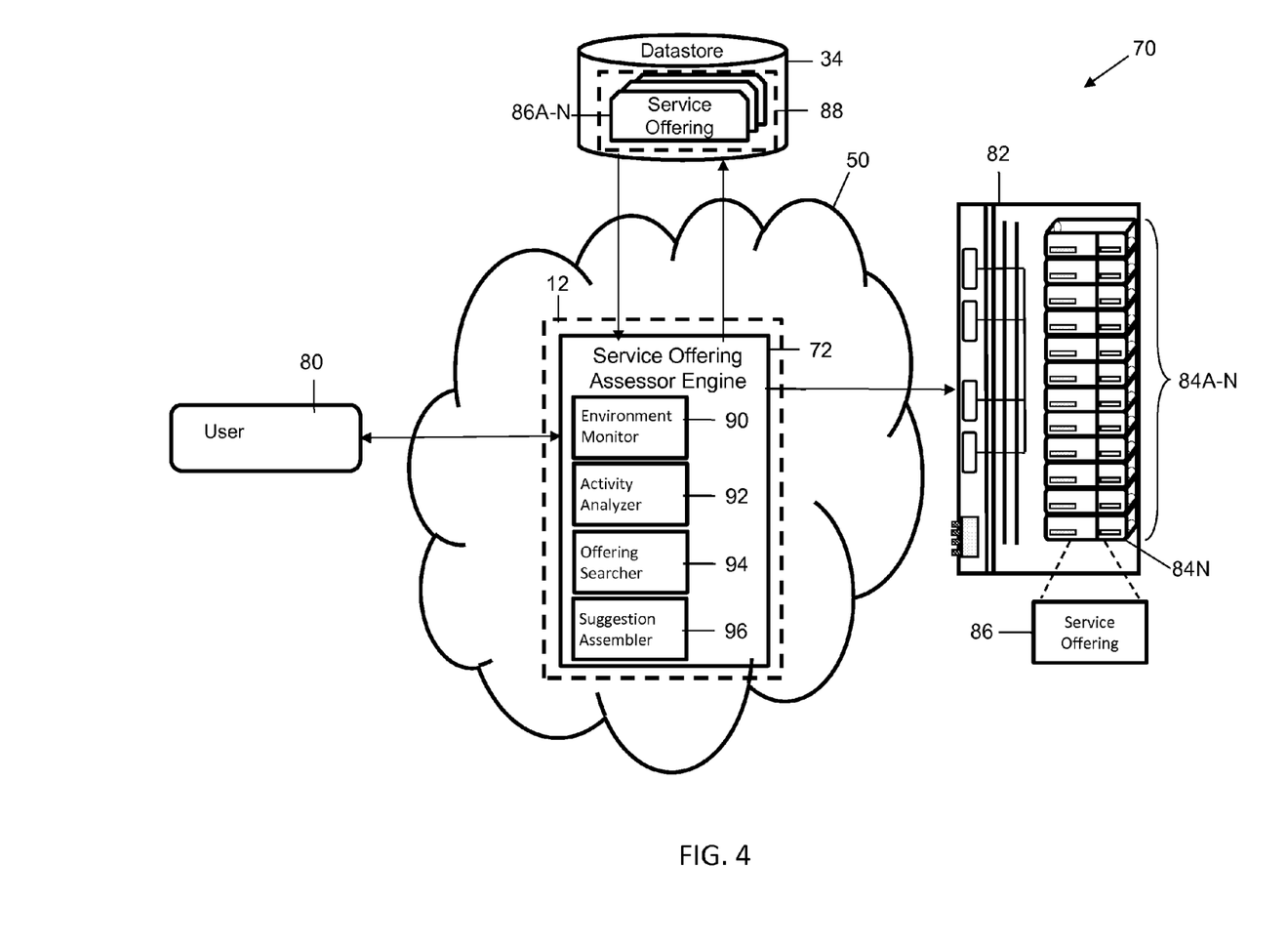
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 4 for illustrative purposes only. In the event the teachings recited herein are practiced in a networked computing environment 70, each client need not have a service offering assessor engine (hereinafter "system 72"). Rather, system 72 could be loaded on a server or server-capable device that communicates (e.g., wirelessly) with the clients to provide device protection therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIG. 4 for brevity purposes.

Along these lines, system 72 may perform multiple functions similar to a general-purpose computer. Specifically, among other functions, system 72 can assess a service offering 86 selected by a user 80 in networked computing environment 70. To accomplish this, system 72 can include: an environment monitor 90, an activity analyzer 92, an offering searcher 94, and a suggestion assembler 96.

User 80 can be anyone who utilizes the services of networked computing environment 70. For example, user 80 may have made a request for a cloud service, and may have selected a particular type of service offering 86 that user 80 wishes to utilize. This service offering 86 can be selected by user 80 from among a plurality of service offerings 80 in a service catalog 88 using any other solution now known or later developed. This selected service offering 86 can be provisioned on networked computing environment 70.

For example, networked computing environment 70 can have a physical server 82 that can be used to provision service offering 86 for user 80. As illustrated, physical server 82 of networked computing environment 70 can be a server from any manufacturer that runs any platform that is adapted to run multiple instances of a virtual server 84. Networked computing environment 70 can also contain any additional number of related physical servers (not shown). One or more of these related physical servers communicate with physical server 82 within cloud computing environment 50. Alternatively, one or more of these related physical servers can communicate with physical server 82 from outside of cloud computing environment 50.

In any case, as stated above, each instance of virtual server 84 (e.g., virtual server 84N) on physical server 82 can operate simultaneously with other virtual server instances 84 while maintaining independence. This means that each of the instances of virtual server 84 can operate independently of other instances of virtual server 84 and does not share information with other instances of virtual server 84 even though the instances of virtual server 84 operate on the same physical server 82. Owing to the characteristics of these instances of virtual server 84, a single physical server 82 can execute a very large number of instances of virtual server 84 concurrently. The independent operation of these instances of virtual server 84 ensures that the number of concurrent instances of virtual server 84 is only limited by the hardware constraints of physical server 82.

Figure 5:
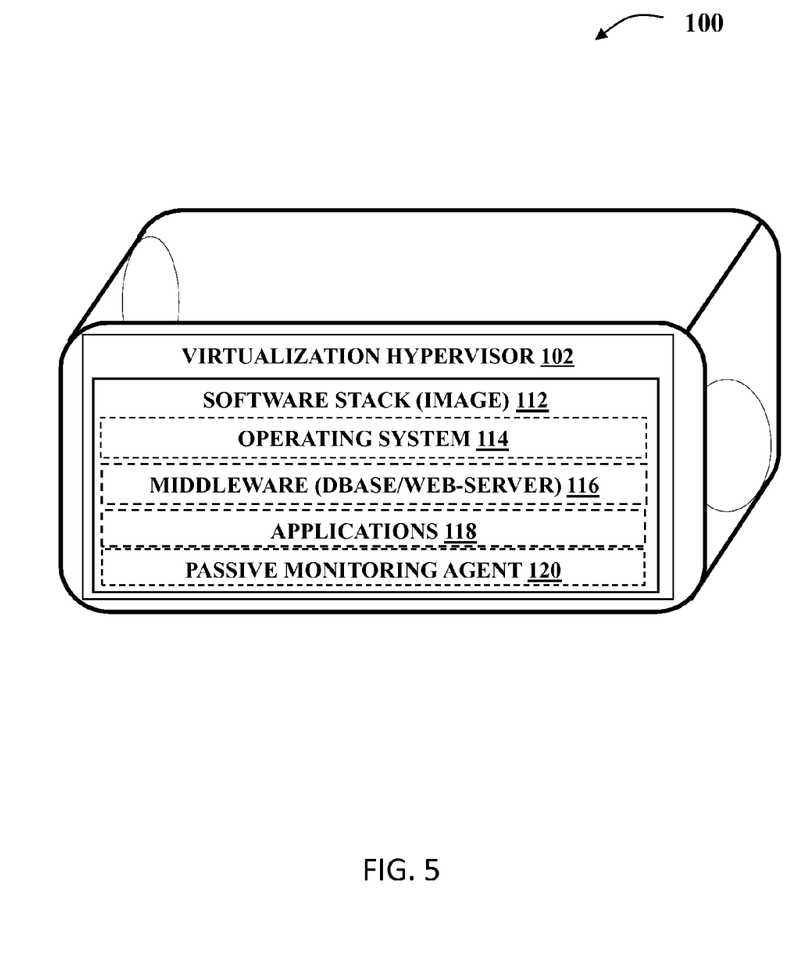
FIG. 5 depicts an example virtual server environment according to an embodiment of the present invention.

Referring now to FIG. 5 in conjunction with FIG. 4, an example virtual server environment 100 according to embodiments of the invention is shown. In an embodiment, virtual server environment 100 can be included in virtual server 84N on physical server 82. It should be understood that virtual server environment 100 is different from a process virtual machine. A process virtual machine is a platform dependent engine, such as a Java Virtual Machine, that executes platform independent code written in a high-level programming language, such as Java, for performing a specific task (Java and Java Virtual Machine are a trademark of Sun Microsystems in the United States and/or elsewhere). In contrast, the virtual server environment 100 of the current invention is a virtual system that simulates an entire computing environment. To this extent, rather than performing only a single task, the virtual server environment 100 of the current invention is an environment within which a variety of tasks, functions, operations, etc., can be carried out by a user 80, such as by executing one or more applications thereon. As such, virtual server environment 100 can be made to simulate a stand-alone computer system in the eyes of a user 80.

To this extent, virtual server environment 100 includes a virtualization hypervisor 102 at the lowest level. Specifically, virtualization hypervisor 102 provides a platform that allows multiple "guest" virtual server 84 systems to run concurrently on the physical server 82. To this extent, virtualization hypervisor 102 provides an abstraction level between the hardware level of physical server 82 and the higher level software functions of each virtual server 84. In order to provide these software functions, each virtual server 84 can include a software stack 112, which can also be referred to as an image. Software stack 112 can contain anything in service offering 86 that was initially provisioned to virtual server 84N and/or anything that has been later installed by user 80. As such, software stack 112 can contain everything that is necessary to simulate a "guest" instance of a particular virtual server 84N on physical server 82 via virtualization hypervisor 102. To this extent, software stack 112 can provide an operating system 114, middleware 116, and one or more applications 118.

As stated above, whether each of the components of the software stack 112 is initially provisioned in the service offering 86 or must be later installed by user 80 depends on the type of service model that the service offering 86 is selected from. For example, provisioning a service offering 86 having an Infrastructure as a Service (IaaS) service model on virtual server 84N would result in software stack 112 having only an operating environment with no operating system 114, middleware 116, or applications 118. In contrast, provisioning a service offering 86 having a Platform as a Service (PaaS) service model would result in software stack 112 having an operating system 114 and/or middleware 116, but no applications 118. Further, provisioning a service offering 86 having a Software as a Service (SaaS) would result in software stack 112 having an operating system 114, middleware 116, and applications 118 from the outset.

The inventors of the invention described herein have discovered certain deficiencies in the current solutions for assessing a service offering 86 selected by a user in a networked computing environment. For example, users 80 who are accustomed to traditional computing methods may automatically gravitate to service offerings 86A-N having service models that involve a lesser level of provider management (such as IaaS or PaaS), as being closest to traditional methods. In doing so, users 80 can fail to appreciate the added efficiency in time and skill resources that can be offered by a service offering 86A-N from a service model that has a greater level of provider management, such as SaaS. For instance, a customer who chooses to provision a virtual machine via IaaS and begins installing and configuring an LDAP server, could often have saved time and effort by utilizing a centralized directory service offered by the cloud. Additionally, the cloud provider could have benefitted monetarily from such decisions by the user 80 by providing the services in lieu of a third party. However, such users 80 may not take the time to look specifically for such a service offering 86A-N in a service catalog 88 or may not be able to find the service if they did look. As such, the users 80 of these current solutions would have no way of being aware that such a service offering 86A-N existed.

Environment monitor 90 of system 72, as executed by computer system/server 12, is configured to monitor network environment 70 containing the service offering 86. This monitoring is performed in order to determine whether for a software configuration activity is being and/or has been performed by user 80. The software configuration activity could be any activity pertaining to installation and/or configuration of software performed by user 80 within network environment 70 (e.g., virtual server environment 100). To this extent, the software configuration activity could include: downloading at least a portion of an application 118 on network environment 70 (e.g., virtual service environment 100), copying at least a portion of application 118 on network environment 70, executing an installation of application 118 on network environment 70, configuring at least a portion of application 118 on network environment 70, and/or the like.

For example, if user 80 has provisioned virtual server 100 with service offering 86 having an IaaS or PaaS service model and later attempts to load, install, configure, etc., an application 118, environment monitor 90 can detect the attempt as a software configuration activity. Environment monitor 90 can perform its functions using a passive monitoring agent 120, which can be installed on the virtual server environment 100, on another virtual server 84 in network environment, or on any other location now known or later developed for installing a passive monitoring agent 120. Additionally or in the alternative, environment monitor 90 can perform its functions based on analysis of a set of snapshots of the virtual server environment and/or using any other solution now known or later developed for performing monitoring functions.

Activity analyzer 92 of system 72, as executed by computer system/server 12, is configured to analyze the software configuration activity to identify a software application 118 that is being configured. For example, in the event that environment monitor 90 detects a software configuration activity, information regarding the configuration activity can be analyzed and/or can be forwarded for analysis. This information can include a name of the application 118, a characteristic (e.g., a pattern or signature of the application during/after the installation, such as install path, installed executable name, etc.) of application 118, a location from which application 118 is downloaded/copied, a name of and/or change to a configuration file modified by the application 118, and/or the like. In any case, activity analyzer 92 can attempt to recognize this information and use the information to establish an identity of the software application on which the user 80 is performing the configuration activity.

Offering searcher 94 of system 72, as executed by computer system/server 12, is configured to search a set of provider-managed service offerings for a provider-managed service offering that has an offered application corresponding to that of the software application. To accomplish this, offering searcher 94 can use the identity, as established by activity analyzer, of one or more applications 118, to which the user 80 was detected as performing a configuration activity. This identity or identities can be used to search other service offerings 86A-N, such as in a service catalog 88 in datastore 34, to find one or more other service offerings (e.g., SaaS) that come pre-loaded with the functionality that the user 80 is trying to achieve. Additionally or in the alternative, a mapping of the software application 118 with other software applications that have common functionality and/or a fuzzy logic type search can be used to identify one or more applications 118 that have common functionality with the application 118 that the user 80 is using. To this extent, the offering searcher 94 can return service offerings 86 that have a greater level of provider management that provide the same or same type of functionality to the user 80.

Suggestion assembler 96 of system 72, as executed by computer system/server 12, is configured to assemble an alternative suggestion for the service offering that includes the provider-managed service offering. Alternative suggestion can include an aggregation of one or more service offerings 86 returned by offering searcher 94. To this extent, alternative suggestion can be thought of as a set of one or more service offerings 86 having a software application 118 or applications 118 that provide the same or same type of functionality as the application 118 that the user 80 was discovered to be configuring on the networked environment 70. Further, each of the offerings in the alternative suggestion can be thought of as having a higher level of provider management, as the application 118 or applications 118 come pre-loaded in the service offering 86. Still further, each of the offerings in the alternative suggestion can be thought of as potential replacements for the originally selected service offering 86.

In any case, suggestion assembler 96 can also determine whether and/or in what manner the alternative suggestion should be provided to user 80. To provide this functionality, a user history corresponding to the user can be gathered. This user history can include, but not be limited to, such factors as: whether the user has previously been notified of an alternative suggestion on the same network environment 70 and/or whether the user has previously been notified of a previous alternative suggestion that is similar to the current alternative suggestion in conjunction with a different network environment. The user history can also include the manner in which the user responded to these past alternative suggestions. Further, the user history can take into account the length of time the network environment 70 has been active.

Suggestion assembler 96 can use these user history factors, as well as others, to make several determinations. For example, the length of time that the network environment 70 has been active can be used to estimate the level of disruption that replacement of the service offering 86 with the provider-managed service offering would cause to the network environment 70 (e.g., to the user 80). This estimation could be used in conjunction with the other user history factors to determine, in conjunction with each of the alternative suggestions, whether the user is likely to accept the recommendation. For example, if the same alternative suggestion has previously been made and rejected by the user 80, further repetitive alternative suggestions are likely to also be rejected and to possibly annoy the user 80. Similarly, if the user has already spent considerable time and effort in installing applications 118 on the network environment, the alternative suggestion is also likely to be rejected. Based on this determination, a decision can be made, with respect to each of the alternative suggestions, whether to forward the alternative suggestion to the user.

For those alternative suggestions for which a decision to forward the alternative suggestions to the user has been made, suggestion assembler 96 can format the alternative suggestions in a manner that is most helpful to the user 80. For example, suggestion assembler 96 can rank any or all of the alternative suggestions with respect to another alternative suggestion or suggestions. This ranking can be based on the user history factors (e.g., which suggestion is most likely to be chosen by the user 80). Additionally or in the alternative, the ranking can be based on which alternative suggestion is most profitable to the user and/or to the provider of the provider-managed service and/or using any other factors that are now known or later developed.

In any case, suggestion assembler 96 can notify the user 80 of the alternative suggestion or suggestions. This notification can be accomplished using any communication method now known or later developed. For example, suggestion assembler 96 can notify the user 80 of the suggestion immediately upon detection of the configuration activity, such as via a popup or a direct message sent to the user 80 as the user 80 is accessing the network environment 70. Additionally or in the alternative, the notification can include an email, a telephone call, an SMS message, and/or any other communication method now known or later developed.

Figure 6:
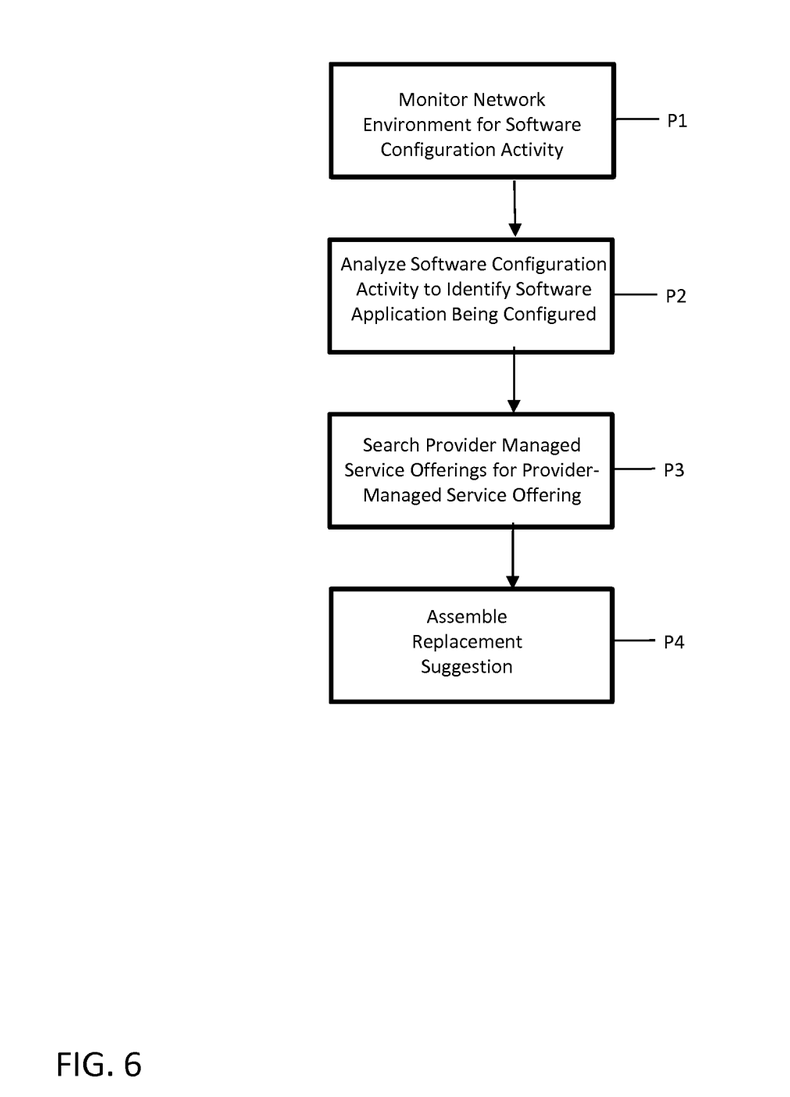
FIG. 6 depicts an example process flowchart according to an embodiment of the present invention.

Referring now to FIG. 6, a method flowchart according to an embodiment of the present invention is shown. At P1, environment monitor 90 of system 72, as executed by computer system/server 12, monitors a network environment containing the service offering for a software configuration activity performed by the user. At P2, activity analyzer 92 of system 72, as executed by computer system/server 12, analyzes the software configuration activity to identify a software application that is being configured. At P3, offering searcher 94, searches a set of provider-managed service offerings for a provider-managed service offering that has an offered application corresponding to that of the software application. At P4, suggestion assembler 96 of system 72, as executed by computer system/server 12, assembles an alternative suggestion for the service offering that includes the provider-managed service offering.

The flowchart of FIG. 6 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for assessing a service offering selected by a user in a networked computing environment, it is understood that the invention further provides various alternative embodiments. For example, in one embodiment, the invention provides a computer-readable/usable medium that includes computer program code to enable a computer infrastructure to assess a service offering selected by a user, as discussed herein. To this extent, the computer-readable/usable medium includes program code that implements each of the various processes of the invention. It is understood that the terms computer-readable medium or computer-usable medium comprise one or more of any type of physical embodiment of the program code. In particular, the computer-readable/usable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide functionality for assessing a service offering selected by a user. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for assessing a service offering selected by a user in a networked computing environment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for assessing a service offering selected by a user in a networked computing environment, the method comprising the computer-implemented processes of:

monitoring, by at least one computer device, a network environment containing the service offering for a software configuration activity performed by the user;

analyzing, by the at least one computer device, the software configuration activity to identify a software application that is being configured;

searching, by the at least one computer device, a set of provider-managed service offerings for a provider-managed service offering that has an offered application corresponding to that of the software application;

gathering a user history corresponding to the user, the user history including: whether the user has previously been notified of an alternative suggestion on the network environment, whether the user has previously been notified of a previous alternative suggestion that is similar to the alternative suggestion in conjunction with a different network environment, a manner in which the user responded to past alternative suggestions, and a length of time the network environment has been active;

estimating a level of disruption which the provider-managed service offering would cause to the network environment based on the length of time;

determining whether to forward the alternative suggestion to the user based on the user history and the calculating; and forwarding to the user, by the at least one computer device in response to a positive determination, an alternative suggestion for the service offering that includes the provider-managed service offering.

2. The method of claim 1, wherein the configuration activity includes at least one of: downloading at least a portion of the software application on the network environment, copying at least a portion of the software application on the network environment, executing an installation of the software application on the network environment, or configuring at least a portion of the software application on the network environment.

3. The method of claim 2, wherein the analyzing further comprises at least one of: recognizing a location from which the downloading of the software application is occurring, recognizing an installation executable name of the software application, recognizing a characteristic of the software application from the executing of the installation, or recognizing a modification of the configuration file resulting from the software application.

4. The method of claim 1, wherein the offered application has common functionality with the software application, and wherein the offered application is not the software application.

5. The method of claim 1, wherein the assembling further comprises:
ranking the alternative suggestion with respect to at least one other alternative suggestion, the ranking being based on at least one of the following: most profitable to the user, most likely to be chosen by the user base on the user history, or possible revenue to a provider of the provider-managed service; and
notifying the user of the alternative suggestion via a communication method.

6. The method of claim 1, wherein the networked computing environment is a cloud computing environment.

7. A system for assessing a service offering selected by a user in a networked computing environment, comprising:
a memory medium comprising instructions;
a bus coupled to the memory medium; and
a processor coupled to the bus that when executing the instructions causes the system to:
monitor a network environment containing the service offering for a software configuration activity performed by the user;
analyze the software configuration activity to identify a software application that is being configured;
search a set of provider-managed service offerings for a provider-managed service offering that has an offered application corresponding to that of the software application;

gather a user history corresponding to the user, the user history including: whether the user has previously been notified of an alternative suggestion on the network environment, whether the user has previously been notified of a previous alternative suggestion that is similar to the alternative suggestion in conjunction with a different network environment, a manner in which the user responded to past alternative suggestions, and a length of time the network environment has been active;

estimate a level of disruption which the provider-managed service offering would cause to the network environment based on the length of time;

decide whether to forward the alternative suggestion to the user based on the user history and the calculating; and forward to the user, in response to a positive determination, an alternative suggestion for the service offering that includes the provider-managed service offering.

8. The system of claim 7, wherein the configuration activity includes at least one of: downloading at least a portion of the software application on the network environment, copying at least a portion of the software application on the network environment, executing an installation of the software application on the network environment, or configuring at least a portion of the software application on the network environment.

9. The system of claim 8, wherein the analyzing further comprises at least one of: recognizing a location from which the downloading of the software application is occurring, recognizing an installation executable name of the software application, recognizing a characteristic of the software application from the executing of the installation, or recognizing a modification of the configuration file resulting from the software application.

10. The system of claim 7, wherein the offered application has common functionality with the software application, and wherein the offered application is not the software application.

11. The system of claim 7, wherein the assembling further comprises:
ranking the alternative suggestion with respect to at least one other alternative suggestion, the ranking being based on at least one of the following: most profitable to the user, most likely to be chosen by the user base on the user history, or possible revenue to a provider of the provider-managed service; and
notifying the user of the alternative suggestion via a communication method.

12. The method of claim 7, wherein the networked computing environment is a cloud computing environment.

13. A computer program product for assessing a service offering selected by a user in a cloud computing environment, the computer program product comprising a computer readable device, and program instructions stored on the computer readable device, that cause at least one computer device to:
monitor a network environment containing the service offering for a software configuration activity performed by the user;
analyze the software configuration activity to identify a software application that is being configured;
search a set of provider-managed service offerings for a provider-managed service offering that has an offered application corresponding to that of the software application;

gather a user history corresponding to the user, the user history including: whether the user has previously been notified of an alternative suggestion on the network environment, whether the user has previously been notified of a previous alternative suggestion that is similar to the alternative suggestion in conjunction with a different network environment, a manner in which the user responded to past alternative suggestions, and a length of time the network environment has been active;

estimate a level of disruption which the provider-managed service offering would cause to the network environment based on the length of time;

decide whether to forward the alternative suggestion to the user based on the user history and the calculating; and forward to the user, in response to a positive determination, an alternative suggestion for the service offering that includes the provider-managed service offering.

14. The computer program product of claim 13, wherein the configuration activity includes at least one of: downloading at least a portion of the software application on the network environment, copying at least a portion of the software application on the network environment, executing an installation of the software application on the network environment, or configuring at least a portion of the software application on the network environment.

15. The computer program product of claim 14, wherein the analyzing further comprises at least one of: recognizing a location from which the downloading of the software application is occurring, recognizing an installation executable name of the software application, recognizing a characteristic of the software application from the executing of the installation, or recognizing a modification of the configuration file resulting from the software application.

16. The computer program product of claim 13, wherein the offered application has common functionality with the software application, and wherein the offered application is not the software application.

17. The computer program product of claim 13, wherein the assembling further causes the at least one computer device to:

rank the alternative suggestion with respect to at least one other alternative suggestion, the ranking being based on at least one of the following: most profitable to the user, most likely to be chosen by the user base on the user history, or possible revenue to a provider of the provider-managed service; and notify the user of the alternative suggestion via a communication method.

* * * * *